United States Patent
Karaoguz et al.

(10) Patent No.: US 9,042,387 B2
(45) Date of Patent: May 26, 2015

(54) UTILIZING A GATEWAY FOR BROKERING AND/OR ARBITRATING SERVICE CONSUMPTION OPTIONS

(75) Inventors: Jeyhan Karaoguz, Irvine, CA (US); Xuemin Chen, San Diego, CA (US); Wael Diab, San Francisco, CA (US); David Garrett, Tustin, CA (US); David Lundgren, Mill Valley, CA (US); Rich Prodan, Niwot, CO (US)

(73) Assignee: BROADCOM CORPORATION, Irvine, CA (US)

(*) Notice: Subject to any disclaimer, the term of this patent is extended or adjusted under 35 U.S.C. 154(b) by 661 days.

(21) Appl. No.: 12/982,453

(22) Filed: Dec. 30, 2010

(65) Prior Publication Data

US 2011/0299550 A1 Dec. 8, 2011

Related U.S. Application Data

(60) Provisional application No. 61/351,696, filed on Jun. 4, 2010.

(51) Int. Cl.
| | |
|---|---|
| *H04L 12/28* | (2006.01) |
| *H04L 29/06* | (2006.01) |
| *G06Q 20/10* | (2012.01) |
| *G06Q 30/02* | (2012.01) |
| *G06Q 30/04* | (2012.01) |
| *H04L 12/857* | (2013.01) |
| *G06Q 40/00* | (2012.01) |
| *H04L 29/08* | (2006.01) |
| *H04L 12/24* | (2006.01) |

(52) U.S. Cl.
CPC .............. *H04L 65/102* (2013.01); *G06Q 20/10* (2013.01); *G06Q 30/0215* (2013.01); *G06Q 30/04* (2013.01); *H04L 47/2491* (2013.01); *G06Q 40/12* (2013.01); *H04L 67/10* (2013.01); *G06Q 30/0226* (2013.01); *H04L 65/40* (2013.01); *H04L 41/32* (2013.01); *H04L 41/5019* (2013.01)

(58) Field of Classification Search
CPC ...................................................... H04N 21/482
See application file for complete search history.

(56) References Cited

U.S. PATENT DOCUMENTS

| | | | | |
|---|---|---|---|---|
| 5,650,994 | A * | 7/1997 | Daley | 370/259 |
| 8,300,541 | B2 * | 10/2012 | Cholas et al. | 370/252 |
| 8,908,699 | B2 * | 12/2014 | Karaoguz et al. | 370/401 |
| 2004/0031058 | A1 * | 2/2004 | Reisman | 725/112 |
| 2004/0162780 | A1 * | 8/2004 | Booth | 705/50 |
| 2006/0025148 | A1 * | 2/2006 | Karaoguz et al. | 455/452.2 |
| 2009/0086740 | A1 * | 4/2009 | Al-Bakri et al. | 370/401 |

(Continued)

*Primary Examiner* — Phirin Sam
(74) *Attorney, Agent, or Firm* — Foley & Lardner LLP

(57) ABSTRACT

A broadband gateway may provision services requested in a home network managed and/or serviced by the broadband gateway by a user associated with the broadband gateway, based on determination of criteria related to the requested service. The requested service may comprise obtaining and/or delivering content for consumption by one or more of a plurality of devices serviced by the broadband gateway in the home network. The criteria may comprise device related data, user preference related information, service performance related parameters, payment related information, and/or energy use related information. The broadband gateway may store information associated with the determined criteria. Provisioning requested services may comprise negotiating with at least one remote resource that may support at least a portion of the requested service. The negotiation may comprise brokering and/or arbitrating a plurality of options of remote resources utilized for providing the at least a portion of the requested service.

20 Claims, 5 Drawing Sheets

(56) References Cited

U.S. PATENT DOCUMENTS

| | | | |
|---|---|---|---|
| 2009/0180484 A1* | 7/2009 | Igarashi | 370/401 |
| 2010/0098058 A1* | 4/2010 | Delangis | 370/352 |
| 2010/0217821 A1* | 8/2010 | Grayson et al. | 709/206 |
| 2010/0272010 A1* | 10/2010 | Hicks, III | 370/328 |
| 2011/0090898 A1* | 4/2011 | Patel et al. | 370/352 |
| 2011/0202956 A1* | 8/2011 | Connelly et al. | 725/38 |
| 2011/0239259 A1* | 9/2011 | Udani | 725/85 |
| 2013/0060942 A1* | 3/2013 | Ansari et al. | 709/225 |

\* cited by examiner

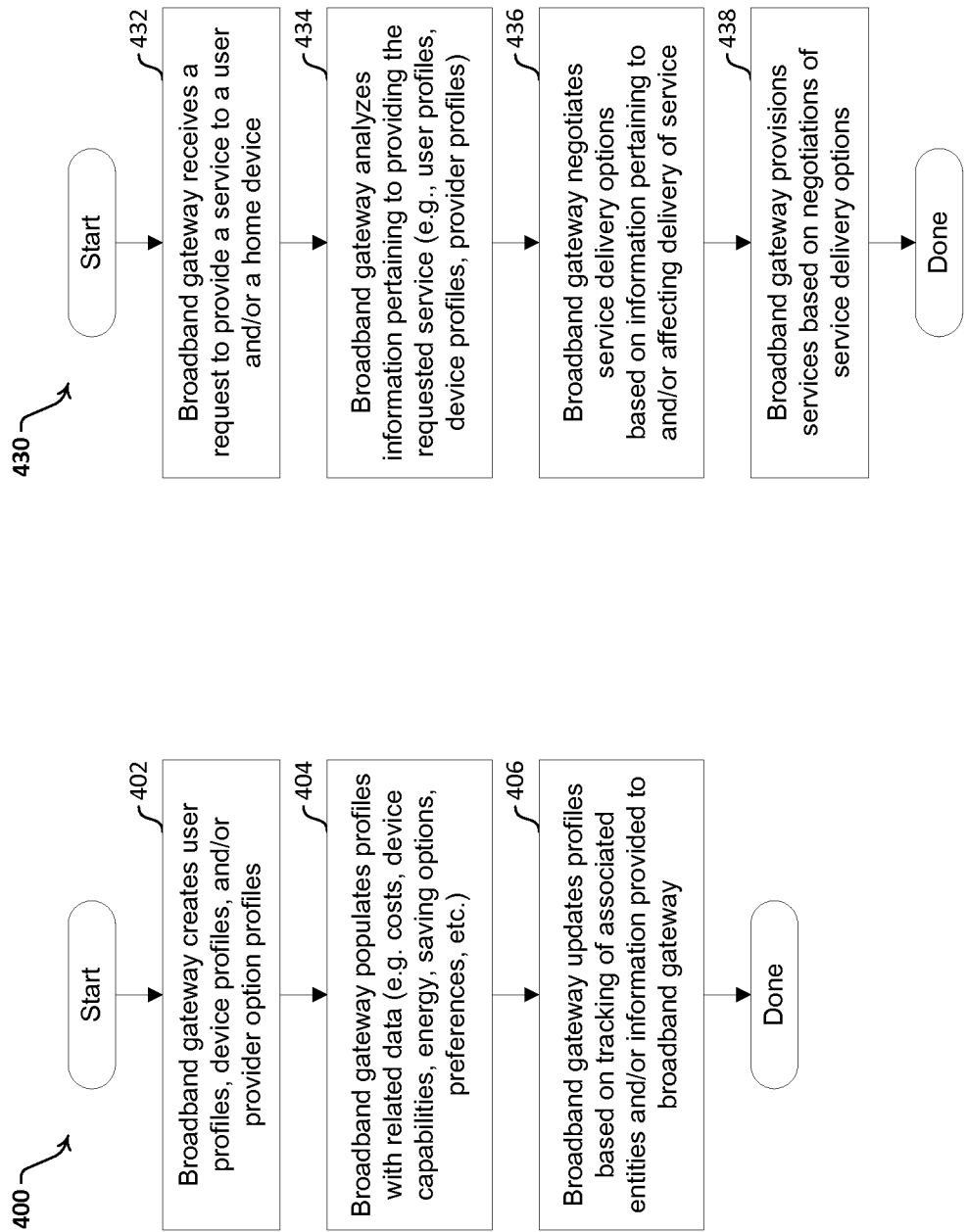

UTILIZING A GATEWAY FOR BROKERING AND/OR ARBITRATING SERVICE CONSUMPTION OPTIONS

CROSS REFERENCE TO RELATED APPLICATIONS/INCORPORATION BY REFERENCE

This patent application makes reference to, claims priority to, and claims benefit from U.S. Provisional Application Ser. No. 61/351,696 filed on Jun. 4, 2010. This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/984,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982 405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,733 filed on Dec. 30, 2010.
Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to audio processing. More specifically, certain embodiments of the invention relate to a method and system for utilizing a gateway for brokering and/or arbitrating service consumption options.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs) and/or mobile devices such as Smartphones. Furthermore, most households may have one or more televisions that may be used to view television broadcasts and/or multimedia content. Television broadcasts may include terrestrial TV, Cable-Television (CATV), satellite TV and/or Internet Protocol television (IPTV) based broadcasts. To protect against unauthorized reception and/or use of multimedia content, service providers may require use of dedicated set-top boxes (STBs) that may be used to encrypt broadcast signals communicated from the service providers to generate suitable video and/or audio streams that may be played via televisions and/or other display/playback devices in the household.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing a gateway for brokering and/or arbitrating service consumption options, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is a flow chart that illustrates exemplary steps for utilizing a broadband gateway to generate and/or update profiles for use in conjunction with service consumption brokering and/or arbitration, in accordance with an embodiment of the invention.

FIG. 4B is a flow chart that illustrates exemplary steps for utilizing a broadband gateway to provision requested services, in accordance with an embodiment of the invention.

DETAILED DESCRIPTION OF THE INVENTION

Certain embodiments of the invention may be found in a method and system for utilizing a gateway for brokering and/or arbitrating service consumption options. In various embodiments of the invention, a broadband gateway, which may be communicatively coupled to a plurality of devices in a home network, and/or which may be operable to handle one or more physical layer connections to corresponding one or more network access service providers, may be utilized to provision services requested by a user associated with the broadband gateway in the home network. The provisioning may be performed based on a plurality of configuration related criteria, which may be determined and/or evaluated by the broadband gateway. The requested services may comprise obtaining and/or delivering content for consumption by one or more of the plurality of devices in the home network. Provisioning the requested services may comprise negotiating with at least one remote resource that may support at least a portion of the requested service. In this regard, the remote resource may be accessed via at least one of the plurality of physical layer connections. The negotiation may comprise brokering and/or arbitrating with a plurality of available options corresponding to the remote resource utilized for providing the at least a portion of the requested service.

The plurality of configuration related criteria may comprise device related information that may be associated with at least one of the plurality of devices that is used in conjunction with the requested service, user preference related information, payment related information, energy use related information, and/or service performance related information. The service performance related information may comprise quality of service, channel coding, and/or content formatting. The user related information may comprise user preferences pertaining to payment, use related information, energy, and/or device related information. The broadband gateway may store information associated with one or more of the plurality of configuration related criteria. At least a portion of the stored information is configurable by the user requesting the provisioned services.

Figure 1:
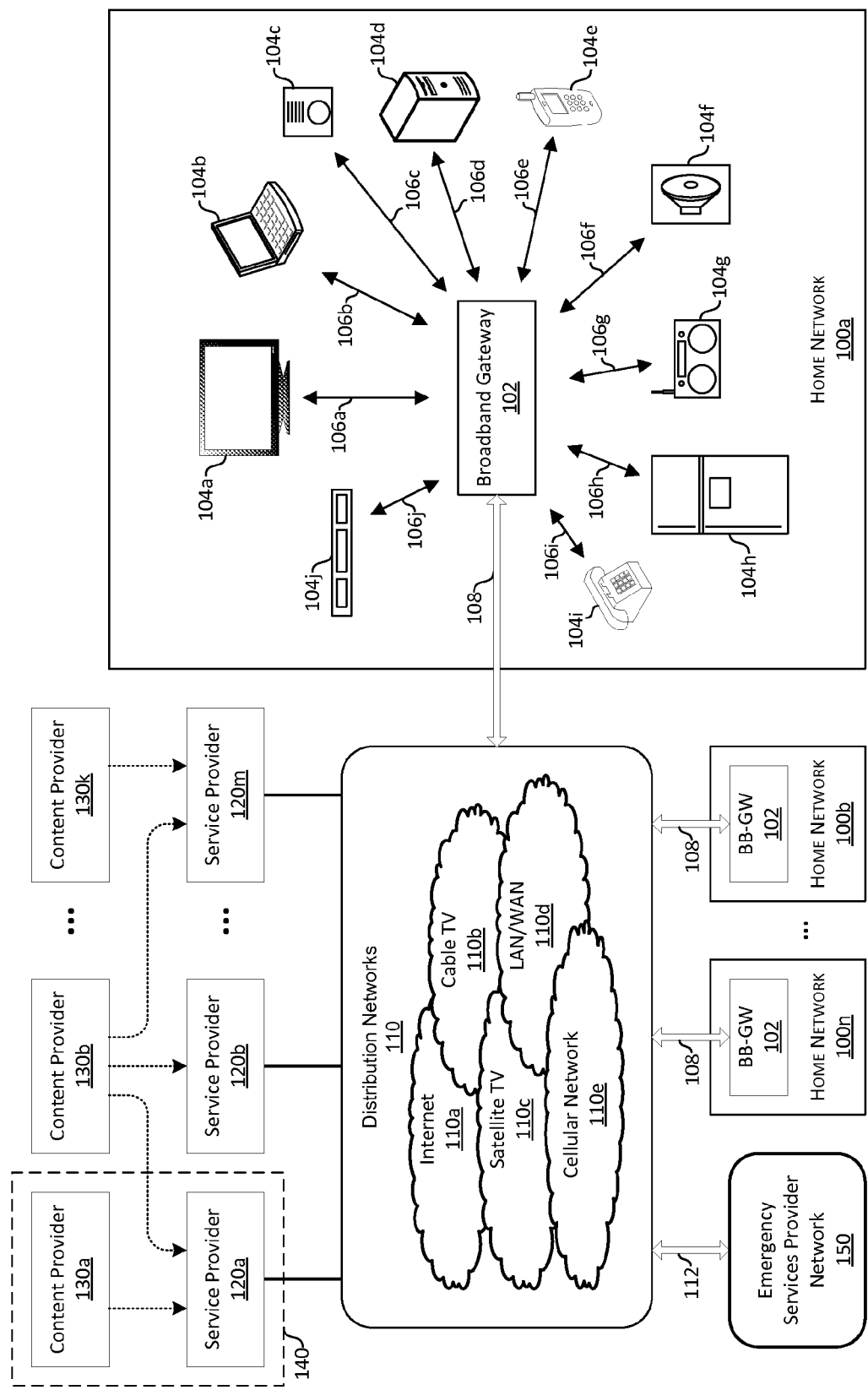
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120a-120m, and a plurality of content providers 130a-130k. The home network 100a may be serviced by a broadband gateway 102. Also shown in FIG. 1 are additional home networks 100b, . . . , 100n, and an emergency services provider network 150. Each of the home networks 100b, . . . , 100n may also be serviced by a broadband gateway 102.

The service providers 120a-120m may comprise various entities which may provide various services to broadband gateways 102 and/or to devices serviced by the broadband gateways 102, such as the plurality of home devices 104a-104j. Some of the service providers 120a-120m may comprise network access service providers which provide physical layer connections to the broadband gateway 102. Such physical layer connections may then be utilized to access content provided by the content providers 130a-130k, access services provided by other ones of the service providers 120a-120m, and/or access an intranet or the Internet at-large. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers. In an exemplary embodiment of the invention, the broadband gateway 102 may enable connecting to multiple service providers 120a-120m to facilitate receiving content originating from one or more of the content providers 130a-130k.

The content providers 130a-130k may comprise various entities and/or networks which may generate, capture, and/or package content that may be distributed to end-users (i.e. "subscribers"), via the service providers 120a-120m and/or the distribution networks 110. In this regard, content may comprise audio, video, multimedia, e-book, gaming, and/or other content. Exemplary content providers may comprise commercial providers of multimedia content, such as major film or television production and/or distribution companies (e.g. Paramount Pictures or Warner Bros.), and/or providers of personal content (e.g. user-generated content). In some instances, as demonstrated by dashed line 140, content and service providers may be merged as singular entities that may provide both content and network access servicing, which may be used to delivering the offered content. The content may be, for example, downloadable and/or streaming, rented and/or purchased. Content originating from the content providers 130a-130k may be distributed to the end-users (e.g. consumers) by the service providers 120a-120m. In some instances, content providers 120a-120m and service providers 120a-120m may be separate entities. In some instances, however, a single provider may provide both content and services, as demonstrated by dashed line 140 for example. That is, an entity that functions as a network access service provider may also provide content and/or services other than network access and, thus, that entity may also be accurately referred to as a "content provider" and/or a "service provider." The content and/or services that are provided by the content provider and/or the service provider may be provided to the broadband gateways 102 via one or more physical connections provided by a network access service provider.

The plurality of distribution networks 110 may comprise one or more networks that may be operable to enable wireless and/or wired communication among a plurality of local and/or or remote entities, based on one or more networking and/or communication infrastructures. In this regard, the plurality of distribution network 110 may be utilized to enable distributing multimedia content generated by the content providers 130a-130k, directly and/or via the service providers 120a-120m, to end-users. The network connectivity available via the plurality of distribution networks 110 may be based on one or more communication standards and/or protocols. The plurality of distribution networks 110 may comprise, for example, Internet 110a, the Cable Television (CATV) network 110b, Satellite Television (TV) network 110c, wireless local network area/wide network area (LAN/WAN) 110d, and/or cellular network 110e.

The Internet 110a may comprise a system of interconnected networks to enable exchange of data among a plurality of nodes, based on one or more networking standards, including, for example, the Internet Protocol (IP). The Internet 110a may enable connectivity among a plurality of private and public, academic, business, and/or government nodes and/or networks. The physical connectivity in the Internet 110a may be provided via, for example, the Public Switched Telephone Network (PSTN), copper wires, fiber-optic cables, wireless interfaces, and/or other protocols and/or standards-based interfaces. The transport functionality in the Internet 110a may be performed based on, for example, one or more transport protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

Each of the home networks 100a-100n may correspond to a location that may comprise a plurality of devices, such as a plurality of home devices 104a-104j in the home network 100a, which may be serviced and/or managed by an instance of the broadband gateway 102. In this regard, the location may be a residence (e.g., home, apartment), a small business, a school, a library, and/or other like settings in which users may want to obtain access to service and/or to content provider networks. The broadband gateway 102 may be utilized in a home network, such as the home network 100a, to provide connectivity between the home network and one or more of the service providers 120a-120m (and/or one or more of the content providers 130a-130k) via the distribution networks 110.

The broadband gateway 102 may comprise suitable logic, circuitry, interfaces, and/or code that may be operable to implement various aspects of the invention. In this regard, the broadband gateway 102 may be operable to communicate with the content providers 130a-130k, the service providers 120a-120m, and the plurality of home devices 104a-104j. In this manner, the broadband gateway 102 may enable bidirectional communication of content and/or other information between the content providers 130a-130k, the service providers 120a-120m and the devices 104a-104j. Communications between the broadband gateway 102 and service providers 120a-120m (and/or the content providers 130a-130k) may be carried over optical, wired, and/or wireless links of the distribution network(s) 110. Similarly, Communications between the broadband gateway 102 and the devices 104a-104j may be carried over optical, wired, and/or wireless links. In an exemplary aspect of the invention, a single broadband gateway 102 may be operable to handle multiple physical layer (i.e., layer 1 of the open-systems interconnection model (OSI)) connections 108 to multiple ones, or portions, of the distribution network(s) 110, where different ones or portions of the distribution network(s) 110 may be owned, operated, leased, or otherwise associated with different ones of the network access service providers 120a-120m. For example, a first network access service provider may provide network access to the broadband gateway 102 via a DSL connection over twisted-pair cabling, and a second network access service provider may provide network access to the broadband gateway 102 via a cable television connection over coaxial cabling. In some instances, the broadband gateway 102 may be operable to concurrently communicate over the multiple physical layer connections provided by the multiple network access service providers.

The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers 130a-130k, wherein the content may be delivered through one or more services providers 120a-120m. For example, the broadband gateway 102 may be operable to perform such operations as network access related processing (e.g. PHY/MAC, and/or transport layer processing), encryption and/or decryption, user and/or account authentication, and/or at least some of video and/or audio processing operations which may be necessary for consumption of multimedia content.

The broadband gateway 102 may communicate with various devices in the home networks using optical, wired and/or wireless communication links. Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with the plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile device 104e, which may comprise a smartphone or other similar devices, a speaker 104f, an AM/FM radio 104g, an appliance 104h (e.g., refrigerator), a phone 104i, and a digital video recorder (DVR) or personal video recorder (PVR) 104j. The broadband gateway 102 may interact with each of the home devices 104a-104j via corresponding links 106a-106j, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a wired or wireless link. The link 106i may comprise, for example, a phone line. The link 106j may comprise, for example, a wired or a wireless link.

The broadband gateway 102 may also be operable to provide and/or support various other, non-content related services in the home network 100a. The broadband gateway 102 may provide, for example, emergency-related services in the home network 100a. For example, the emergency services provider network 150 may be connected to the distribution networks 110 via a link 112. The emergency services provider network 150 may be associated with one or more emergency service provider entities. For example, a public entity such as a 911 center and/or a private entity such as a security company may be able to interact with the broadband gateway 102 in the home network 100a via the distribution networks 110.

While the broadband gateway 102 is shown in FIG. 1 as a single and separate device, the invention need not be so limited. In one embodiment of the invention, the broadband gateway functionality may be implemented in a distributed manner over two or more devices. Furthermore, the broadband gateway may be implemented as a virtual platform, for example in instances where it may be implemented in distributed manner. In another embodiment of the invention, some or all of the functionality of the broadband gateway may be implemented within one of the televisions available in the home.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, the broadband gateway 102 may be utilized as an interface device that may allow one or more service providers 120a-120m, content providers 130a-130k, and/or emergency service provider networks 150 to interact with various devices in a home network, such as in the home network 100a. In this regard, the broadband gateway 102 may support configuring and/or using the plurality of broadband connections 108. The broadband connections 108 may comprise optical, wired and/or wireless connections between the broadband gateway 102 and the distribution networks 110, to enable communication between the broadband gateway 102 and the service providers 120a-120m, content providers 130a-130k, and/or emergency service provider networks 150 for example. The broadband gateway 102 may be operable to perform and/or provide various services that may pertain to enabling and/or facilitating reception of data, such as multimedia content, for example, from one or more content providers, wherein the content may be delivered through one or more services providers. The broadband gateway 102 may distribute the received content to one or more devices in a home network, for consumption, and/or may perform, directly and/or indirectly using other devices, any processing and/or operations (e.g., decryption and/or account validation) that may be needed to ensure that the content may be consumed by the target home device(s).

The broadband gateway 102 may also provide and/or support various other services in the home network 100a beyond reception and/or download of content. For example, the broadband gateway 102 may be operable to provide energy management in the home network 100a, by controlling and/or adjusting configuration of one or more devices in the home network to reduce power consumption for example. The broadband gateway 102 may also provide emergency-related services in the home network 100a, including allowing first responders to provide alerts to a select group of users by accessing the broadband gateway 102 via secure links provided by the service/content providers.

In various embodiments of the invention, the broadband gateway 102 may be utilized to perform various search and/or negotiation related functions in conjunction with providing services to one or more users and/or devices in a home network, such as in the home network 100a. The services may comprise, for example, obtaining content which may be consumed using one or more of the devices 104a-104j in the home network 100a. Obtaining content may be performed based on, for example, a request for a particular content received from a user associated with the broadband gateway 102 within the home network 100a. In this regard, the broadband gateway 102 may be operable to perform various tasks to enable obtaining content from a wide range of content sources, such as one or more of the content provider 130a-130k, which may be available to and/or accessed by the broadband gateway 102 through the service providers 120a-120m for example. Exemplary tasks may comprise, for example, searching, finding, negotiating, purchasing, storing, and/or verifying requested content to devices that may be utilized in conjunction with the requested service. The tasks performed by the broadband gateway may be automated and/or interactive, based on user input or feedback, for example. The broadband gateway 102 may be operable to perform one or more of the tasks instantaneously, when the service requests are received, or in a delayed manner. For example, in instances where the requested service may comprise obtaining content, content delivery may be performed in the form of real-time streaming or in a delayed/stored manner, where the content may be delivered and stored for subsequent consumption at some point in the future. These tasks may be performed directly by the broadband gateway 102. The tasks may also be performed using 3rd party applications which may be downloaded into the broadband gateway 102, and/or may be executed or run using remote dedicated components or devices.

In an embodiment of the invention, when a service request is received, the broadband gateway 102 may search for a plurality of entities external to the home network 100a that may be utilized to perform or support the requested services, and/or aspects or parts thereof. For example, in instance where the requested service may comprise obtaining content, the broadband gateway 102 may search for one or more content or service providers that may be utilized in conjunction with providing and/or delivering the requested content. Furthermore, the broadband gateway 102 may also determine and/or evaluate, when handling service requests, a plurality of service configuration criteria which may affect, and/or may be relevant to performance of the requested service. In this regard, the broadband gateway 102 may utilize the plurality of service configuration criteria for controlling and/or managing tasks performed when providing requested services, and/or for selecting or omitting various aspects or features thereof. The plurality of service configuration criteria may comprise, and/or may be generated based on, for example, client devices related information, user related information, energy related information, cost related information, and/or provider related information. In this regard, the cost related information may comprise data pertaining to subscription models, payment options and/or structure, cost saving options, and/or available credits, discounts, and/or rewards. The energy related information may comprise energy consumption requirements, limitations, and/or energy saving or optimization options or preferences.

The client device related information may comprise, for example, capabilities, requirements, limitations, availability and/or accessibility status, load, and/or available energy and/or cost saving options which may be utilized in conjunction with performing and/or supporting the requested services. The user related information may comprise, for example, user preferences related data. In this regard, user preferences related data may comprise user preferences pertaining to such criteria as devices used in conjunction with services, energy consumption or saving, cost, quality of service, providers, and/or consumption. For example, consumption related data may comprise preferences pertaining to time, manner, location for example within the home network 102a, and/or preferred device(s) to be utilized in conjunction with requested services. The provider related information may comprise, for example, quality of service offered, energy consumption requirement and/or saving options, cost and/or discount data, and/or timing or manner by which the service, or aspects thereof, may be offered.

For example, a user in the home network 100a may request a particular content, which may be played via the television 104a, the laptop computer 104b, and/or the mobile device 104e. Accordingly, the broadband gateway 102 may initially search to determine which content providers 130 and/or service providers 120 may offer delivery of that particular content. The broadband gateway 102 may determine, for example, that the requested particular content may be obtained from content providers 130a and/or 130b, and that the content may be delivered via the service providers 120a, 120b, and/or 120m. Accordingly, the broadband gateway 102 may determine, for example, that 4 different content/servicer provide combinations, comprising {content provider 130a, service provider 120a}, {content provider 130b, service provider 120a}, {content provider 130b, service provider 120b}, and {content provider 130b, service provider 120m}, may be suitable to provide the requested content. The broadband gateway 102 may then determine and/or evaluate suitable ones of these provider combinations based on, for example, costs, energy consumption, quality of service, quality and/or configuration of content, timing and/or manner by which the content may be delivered. Furthermore, the broadband gateway 102 may also incorporate into the evaluation of suitability of the discovered provider combinations, additional information, such as, requesting user's preferences and/or devices information, which is related to devices that may be utilized in conjunction with consuming the requested content within the home network 102. For example, user preferences may specify whether the user is requesting the content for consumption via the television 104a or via the mobile device 104e. In this regard, copies of the content destined for consumption via the television 104a may comprise higher resolution than copies of the same content that are destined for consumption via the mobile device 104e, which may typically comprise a smaller display. Thus, the user preferences may be configured as to specify that while user preferred choice is to consume the requested content via the television 104a, the user may ascent to obtaining content that is suitable for consumption via the mobile device 104e in exchange for certain payment adjustments or compensation such as receiving discount or rewards, and/or for achieving some predetermined energy saving within the home network 100a and/or the distribution networks 110. User preferences may also specify whether the user may require instant delivery of the requested content, and/or whether the requesting user may ascent to delayed delivery, which may enable delivering the content at times of low loads in the distribution networks 110.

In an embodiment of the invention, the broadband gateway 102 may be configured as, and/or may present users with a negotiation platform that may be utilized in conjunction with search operations, to enable selecting, configuring, and/or modifying various aspects of the requested services. For example, in instances where the requested service comprises obtaining a particular content, source of content and/or the manner and/or timing in which content may be obtained and/or delivered. In this regard, the broadband gateway 102 may be utilized to negotiate with a plurality of entities, such as content or service providers, which may be utilized in conjunction with performing the requested services. The negotiation performed by the broadband gateway 102 may comprise, for example, brokering and/or arbitrating with available entities providing and/or supporting the requested service, or aspects thereof, to further enhance and/or optimize the manner by which the requested services are performed. For example, in instances where the broadband gateway 102 receives requests to obtain particular content, the broadband gateway 102 may initially search for, and/or discover a plurality of provider options that may be utilized in obtaining the particular requested content. The broadband gateway 102 may also evaluate the plurality of service configuration criteria pertaining to, and/or affecting obtaining the particular content. Based on that, the broadband gateway 102 may generate and place bids for obtaining the requested particular content with one or more of the discovered plurality of provider options, to enable enhancing desirability of the offered service or content based on the plurality of the configuration criteria. For example, the broadband gateway 102 may place a bid with the content provider 130a and/or service provider 120a offering to accept content with less compression, lower channel encoding rates, and/or delayed delivery in exchange for payment or energy credits, for example.

In an embodiment of the invention, the broadband gateway 102 may be operable to perform user defined search tasks, for finding and/or discovering a plurality of options for providing a particular requested service, or aspects thereof, via the broadband gateway 102. For example, in instance where the requested service may comprise obtaining a particular content, the broadband gateway 102 may search and find, based on preconfigured user criteria and/or preference, one or more of the content providers 130a-130k who may provide the particular content, and/or one or more of the service providers 120a-120m who may provide the necessary network access for receiving the particular content. Furthermore, the broadband gateway 102 may be configured as a search agent, and/or may be operable to execute or run a software agent, and/or other like software program and/or application capable of performing the search functions described above. The broadband gateway 102 may also utilize remote and/or dedicated search functions, and/or 3rd party applications that may be downloaded into and/or run by the broadband gateway 102, to enable performing search related functions, and/or portions thereof, indirectly and/or remotely.

In an embodiment of the invention, the broadband gateway 102 may be operable to generate and/or update at least a portion of the plurality of service configuration criteria. In this regard, the broadband gateway 102 may adaptively and/or dynamically generate and/or update, for example, the user related information and/or the device related information. For example, upon discovering a client device in the home network 100a, the broadband gateway 102 may determine capabilities, requirements, limitations, and/or available energy and/or cost saving options available in the discovered client device. The broadband gateway 102 may also continually monitor and/or communicate with the client devices, such as the home devices 104a-104j in the home network 100a, to discover and/or determine any changes and/or modifications in capabilities, requirements, limitations, and/or available energy and/or cost saving options in the client devices. Similarly, the broadband gateway 102 may also track and/or monitor user actions and/or use patterns, such as preferences with regard to timing or manner of use of certain devices and/or for certain types of content. The broadband gateway 102 may then utilize that information to update and/or generate user related profile that may be utilized in conjunction with configuration of and/or negotiations for requested services by that user.

Figure 2:
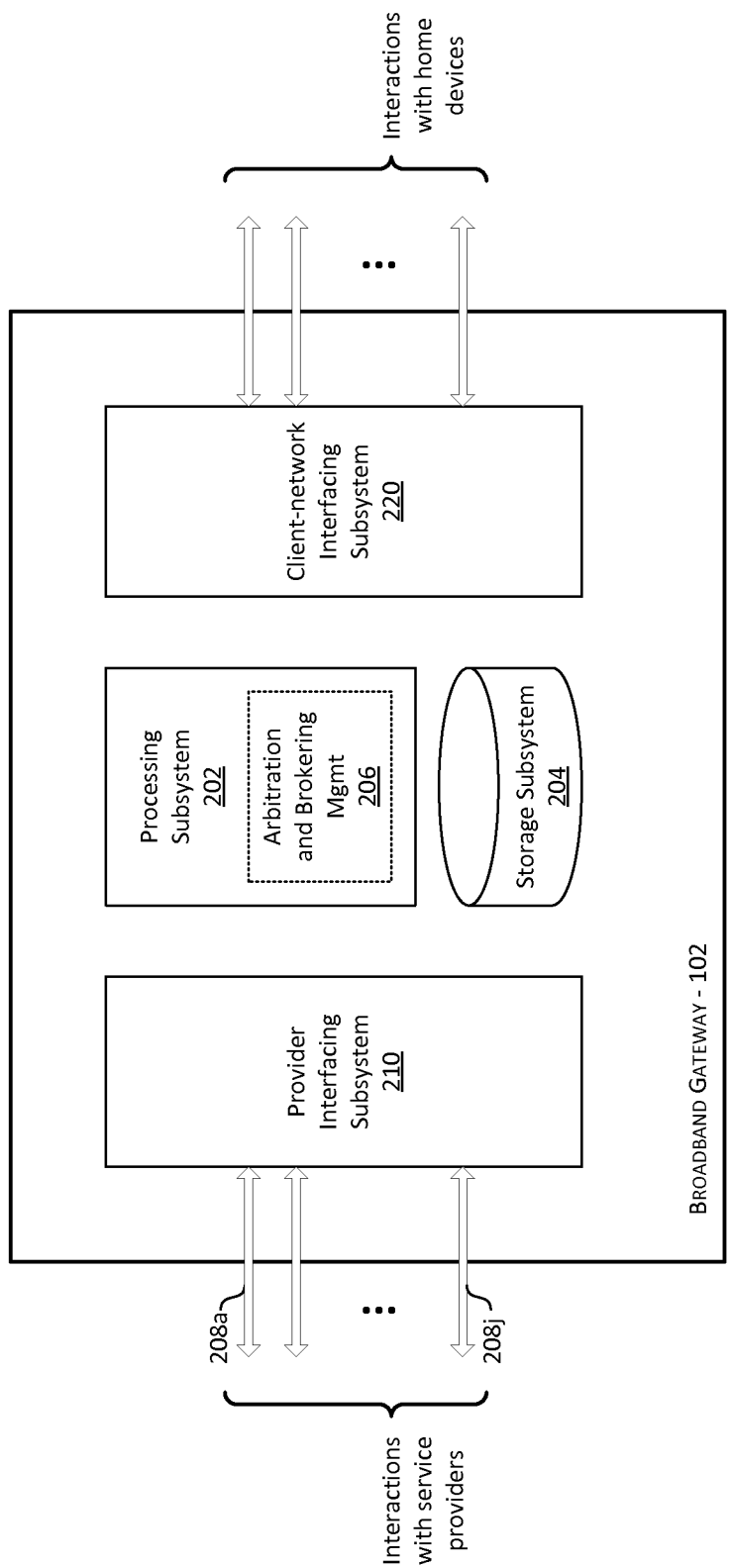
FIG. 2 is a block diagram illustrating an exemplary broadband gateway, in accordance with an embodiment of the invention.

FIG. 2 is a block diagram illustrating an exemplary broadband gateway, in accordance with an embodiment of the invention. Referring to FIG. 2, there is shown a broadband gateway 200 that may correspond to, and/or may be similar to the broadband gateway 102, substantially as described with respect to FIG. 1.

The broadband gateway 200 may comprise suitable logic, circuitry, code, and/or interfaces that may be operable to provide connectivity between one or more external networks, such as the distribution networks 110 shown in FIG. 1, for example, and one or more devices in a home network, such as the home devices 104a-104j in the home network 100a shown in FIG. 1. In this regard, the broadband gateway 200 may operate as an interface device that allows one or more service providers 120a-120m, one or more content providers 130a-130k, and/or emergency service providers 150, to interact with various devices in a home network serviced by the broadband gateway 200, and/or among the home devices themselves within the serviced home network.

The broadband gateway 200 may interact with serviced devices in a home network, such as the home network 100a, via wired and/or wireless communication links, to support communicating between the broadband gateway 200 and the home devices, and/or among the home devices via the broadband gateway 200. In this regard, the broadband gateway 200 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 200 may communicate with the various devices in the home via more than one home network.

The broadband gateway 200 may comprise a plurality of modules, each of which may comprise hardware, software, or a combination thereof that may be utilized to perform various operations associated with the broadband gateway 200. For example, in an embodiment of the invention, shown in FIG. 2, the broadband gateway 200 may comprise a processing subsystem 202, a storage subsystem 204, a provider interfacing subsystem 210, and a client-network interfacing subsystem 220. In some instances, the broadband gateway 200 may be such that the various modules listed above may be distributed over multiple devices. Moreover, the modules listed above are provided by way of illustration and not of limitation. Other configurations and/or architectures of the broadband gateway 200 may be implemented. For example, the broadband gateway 200 may be a virtual gateway setup in a network by utilizing virtual machines (VMs) and/or next-generation (NG) data centers.

The processing subsystem 202 may comprise suitable logic, circuitry, interfaces, and/or code that may be operable to process data received from the service and/or content providers and/or data received from one or more devices in the home network 100a. In this regard, the processing subsystem 202 may comprise one or more portions that are suitable to handle certain types of data such as video data and/or audio data, for example. The processing subsystem 202 may also be operable to control and/or manage operations of the broadband gateway 200, and/or performing tasks and/or applications therein. For example, the processing subsystem 202 may enable execution of applications, programs and/or code, which may be stored in the storage subsystem 204 for example. In this regard, the processing subsystem 202 may be operable to configure and/or control operations of various components and/or subsystems of the broadband gateway 200, and/or other devices managed by and/or connected to broadband gateway 200, by utilizing, for example, one or more control signals. The processing subsystem 202 may also control data transfers within the broadband gateway 200, in the course of performing various applications and/or tasks for example. The processing subsystem 202 may comprise, for example, a plurality of processors, which may be general and/or specialized processors (e.g. CPU, video processors, and/or audio processors). While the processing subsystem 202 is shown herein as a single block, the invention needs not be so limited. Accordingly, in instances where the broadband gateway 200 is implemented a distributed platform, some of the operations and/or functions described herein with regard to the processing subsystem 202 may be performed by different components that may be located in different devices. In an exemplary aspect of the invention, the processing subsystem 202 may comprise an arbitration and brokering management block 206. In this regard, the arbitration and brokering management block 206 may comprise suitable logic, circuitry, interfaces, and/or code that may be operable to perform, control, and/or manage brokering and/or arbitration of services provided by the broadband gateway 200, substantially as described with regard to FIG. 1.

The storage subsystem 204 may comprise suitable logic, circuitry, interfaces, and/or code that may be operable to store data utilized in the operations of the broadband gateway 200. In this regard, the storage subsystem 204 may comprise one or more memory devices that may enable permanent and/or non-permanent storage, buffering, and/or fetching of data, code and/or other information which may be used, consumed, and/or handled in the broadband gateway 200. For example, the storage subsystem 204 may be utilized to store configuration data, parameters, device information, tracking and/or monitoring information, security information, and intermediate processing data, for example. The storage subsystem 204 may comprise storage media integrated in the broadband gateway 200 and/or one or more removable storage devices. The storage subsystem 204 may comprise different memory technologies, including, for example, read-only memory (ROM), random access memory (RAM), and/or Flash memory. In an exemplary aspect of the invention, the storage subsystem 204 may be utilized to store data and/or code in conjunction with service negotiation related functions and/or operations, such as arbitration and brokering for example, which may be provided by the broadband gateway 200, substantially as described with regard to FIG. 1.

The provider interfacing subsystem 210 may comprise suitable logic, circuitry, interfaces, and/or code that may be operable to communicate data via one or more physical layer connections 208a-208j, to one or more corresponding network access service providers via the distribution networks 110 for example. The provider interfacing subsystem 210 may be operable to support multiple communication protocols, standards, and/or data transport technologies. In this regard, each of the physical layer connections 208a-208j may connect the gateway 200 to different network access service provider, and may comprise a wired, optical, or wireless connection. Each of the physical layer connections 208a-208j may utilize different physical media and/or different physical layer protocols. For example, the connection 208a may comprise a DSL over twisted-pair connection whereas and the connection 208j may comprise a CATV over coaxial cable connection. Accordingly, the provider interfacing subsystem 210 may enable accessing and/or communicating with one or more service providers 120a-120m and/or content providers 120a-120m, via the distribution networks 110. The provider interfacing subsystem 210 may also be utilized to communicate data to and/or from third parties. In this regard, the provider interfacing subsystem 210 may enable gateway-to-gateway communication and/or interactions between the broadband gateway 200 and communication devices located outside the home network 100a, directly and/or indirectly through distribution networks corresponding to one or more service providers. The provider interfacing subsystem 210 may enable concurrently communicating with multiple and/or different service/content providers and/or devices.

The client-network interfacing subsystem 220 may comprise suitable logic, circuitry, interfaces, and/or code that may be operable to send data to one or more devices in the home network serviced and/or managed by the broadband gateway, such as the home network 100a. The client-network interfacing subsystem 220 may also be operable to receive data from one or more devices in the home network 100a. The client-network interfacing subsystem 220 may be operable to support multiple communication protocols, standards, and/or data transport technologies. For example, the client-network interfacing subsystem 220 may support the links 106a-106j.

In operation, the broadband gateway 200 may be utilized as an interface device that may interact with a plurality of devices in a home network, such as such as the devices 104a-104j in the home network 100a, and/or may provide connectivity between the devices in the home network and service and/or content providers. The broadband gateway 200 may also interact with a plurality of home devices in a home network, such as the devices 104a-104j in the home network 100a, using the client-network interfacing subsystem 220. In this regard, the client-network interfacing subsystem 220 may support use of one or more of the links 106a-106j. Furthermore, the broadband gateway 200 may interact with one or more service providers 120a-120m via the provider interfacing subsystem 210, to enable exchanging messages and/or content for example, via one or more of the distribution networks 110. Accordingly, the broadband gateway 200 may enable and/or facilitate obtaining content (e.g. multimedia content) from one or more content providers 130a-130k, wherein the content may be delivered through one or more services providers 120a-120m. The broadband gateway 200 may distribute the received content to one or more of the plurality of home devices 104a-104j, for content consumption, and/or may perform, directly via the processing subsystem 202 and/or indirectly utilizing other devices communicatively coupled to the broadband gateway 200, any processing and/or procedures (e.g. decryption and/or account validation) that may be necessary to ensure that the content may be consumed by the home device(s).

The broadband gateway 200 may be operable to run or execute an agent to extract content, rating, copyright, language, privacy rules, and automatically add user generated content, for example. Such agent may be run or executed in connection with the processing subsystem 202 of the broadband gateway 200, for example. Furthermore, the broadband gateway 200 may be operable to combine and/or blend multiple contents for use as single content in the home network. Such combination may be performed in one or more of the modules of the broadband gateway 200. For example, the broadband gateway 200 may blend different video and audio contents for an event by accessing one or more service/content providers and providing automatic and/or manual content synchronization.

The broadband gateway 200 may also provide various services and/or tasks beyond, in addition to, and/or in conjunction with content delivery to home devices. For example, the broadband gateway 200 may perform content search, transport discovery, ranking, and/or sorting. In this regard, some operations may be performed based on content quality, price, quality-of-service (QoS), and network protocols supported by the devices in the home network, such as service level agreements (SLAs), for example.

The broadband gateway 200 may provide user interface services in the home network. In this regard, the broadband gateway 200 may be operable to support user interfaces, and/or to generate and/or store data corresponding thereto, which may be utilized to enable interactions between the broadband gateway 200 and users, such as in the home network 100a for example. Exemplary user interfaces may comprise graphic user interfaces (GUIs), which may enable visually displaying and/or providing interaction with users, to provide visual interaction with customized content for example. Information inputted and/or outputted using the user interfaces may be stored in the broadband gateway 200, via the storage subsystem 204 for example. The user interfaces may enable configuring the broadband gateway 200, and/or any applications and/or services provided thereby, and/or may also be utilized to configure and/or adjust other devices in the home network 100a. GUIs, and like interfaces, may be displayed using one or more devices coupled to the broadband gateway 200. For example, interfaces generated and/or used by the broadband gateway 200 may be displayed using the television 104a.

The broadband gateway 200 may also be utilized to create, maintain, and/or update a plurality of profiles corresponding to users, devices, and/or services available in the home network 100a. Furthermore, user interfaces supported and/or used by the broadband gateway 200 may be utilized to enable displaying and/or modifying user, device, and/or service profiles. Data corresponding to these profiles may be stored in the storage subsystem 204 of the broadband gateway 200. For example, device-profiles may be utilized to store information associated with particular devices that may be coupled to and/or serviced by the broadband gateway 200. In this regard, device-profiles may be utilized for storage of information pertaining to device capabilities, limitations, requirements, and/or configuration parameters therefor. User-profiles may be utilize to store information associated with particular users, such as setting preferences for various devices and/or services that may be utilized by a particular user in conjunction with the broadband gateway 200. The broadband gateway 200 may utilize user and/or home device profile information to, for example, select layered video service(s) and/or transmission. In some instances, the programming and/or enhanced video layers received by the broadband gateway 200 may be aggregated midstream by one or more network or routing nodes.

The gateway functionality associated with a user, such as security features, preferences, applications, electronic programming guides (EPGs), and user profile, for example, may be ported from the broadband gateway 200 to one or more other broadband gateways 200 in other locations. In some instances, a visitor may be allowed access to their content outside their service/content provider service area by, for example, classifying the access level for different users and/or by providing limited access to content. Moreover, the broadband gateway 200 may allow multiple user interface software structures by, for example, standardizing an interface to service/content providers and devices in the home network.

In various embodiments of the invention, the broadband gateway 200 may be utilized to perform various search and/or negotiation related functions in conjunction with providing services to one or more users and/or devices in a home network, such as in the home network 100a, substantially as described with regard to FIG. 1. In this regard, the broadband gateway 200 may be operable to perform various tasks to enable providing the requested service, and/or various aspects or feathers thereof. For example, the broadband gateway 200 may be operable to perform, via the arbitration and brokering management block 206 for example, searching, finding, negotiating, purchasing, storing, and/or verifying of requested content to devices serviced or managed by the broadband gateway 200, and utilized in conjunction with the requested service. The broadband gateway 200 may be operable to perform one or more of the tasks instantaneously, when the service requests are received, or in a delayed manner. For example, in instances where the requested service may comprise obtaining content, content delivery may be perform in the form of real-time streaming or in a delayed/stored manner, where the content may be delivered and stored for subsequent consumption at some point in the future.

When a service request is received, the broadband gateway 200 may search for a plurality of providers which may be utilized in performing or supporting the requested services, and/or aspects or parts thereof. For example, in instance where the requested service may comprise obtaining content, the broadband gateway 200 may search for one or more content or service providers that may be utilized in conjunction with providing and/or delivering the requested content. Furthermore, the broadband gateway 200 may also determine and/or evaluate, when handling service requests, a plurality of service configuration criteria which may affect, and/or may be relevant to performance of the requested service. In this regard, the broadband gateway 200 may utilize the plurality of service configuration criteria for controlling and/or managing tasks performed when providing requested services, and/or for selecting or omitting various aspects or features thereof, substantially as described with regard to FIG. 1.

The broadband gateway 200 may be configured as, and/or may present users with a negotiation platform that may be utilized in conjunction with the various tasks that may be performed in the course of providing services requested from the broadband gateway 200. In this regard, the arbitration and brokering management block 206 may be utilize to enable negotiating with external entities, via one or more of the physical layers 208a-208j, to enable selecting, configuring, and/or modifying various aspects of the requested services. For example, in instances where the requested service may comprise obtaining a particular content, source of content and/or the manner and/or timing in which content may be obtained and/or delivered. In this regard, the broadband gateway 200 may be utilized to negotiate with content and/or service providers, which may be utilized in conjunction with performing the requested services. The negotiation may pertain to formatting and/or configuring of the content for example utilized resolution, selection of one or more of the physical layer connections 208a-208j for use in conjunction with delivery of the content, channel encoding for use in conjunction with transport of the content, timing and/or manner of delivery, such as use of delayed and/or partitioning of the content during delivery. During handling of requested services, the arbitration and brokering management block 206 may be utilized to broker and/or arbitrate with available entities providing and/or supporting the requested service, or aspects thereof, substantially as described with regard to FIG. 1.

The broadband gateway 200 may perform user defined search tasks, for finding and/or discovering a plurality of options for providing a particular requested service, or aspects thereof, via the broadband gateway 200. For example, in instances where the requested service may comprise obtaining a particular content, the broadband gateway 200 may search and find, based on preconfigured user criteria and/or preference, one or more content providers and/or service providers. The broadband gateway 200 may be operable to generate and/or update at least a portion of service configuration criteria that is utilized to evaluate and/or control performance of requested services, substantially as described with regard to FIG. 1. In this regard, the broadband gateway 200 may adaptively and/or dynamically generate and/or update, for example, user or device profiles. For example, upon discovering a client device, the broadband gateway 200 may determine capabilities, requirements, limitations, and/or available energy and/or cost saving options available in the discovered device. The broadband gateway 200 may also continually monitor and/or communicate with client devices, such as the home devices 104a-104j in the home network 100a, to discover and/or determine any changes and/or modifications pertaining to various parameters and/or information maintained in corresponding device profiles. Similarly, the broadband gateway 200 may also track and/or monitor user actions and/or use patterns, such as preferences with regard to timing or manner of use of certain devices and/or for certain types of content. The broadband gateway 200 may then utilize that information to update and/or generate user related profile that may be used in conjunction with configuration of and/or negotiations for requested services by that user.

Figure 3:
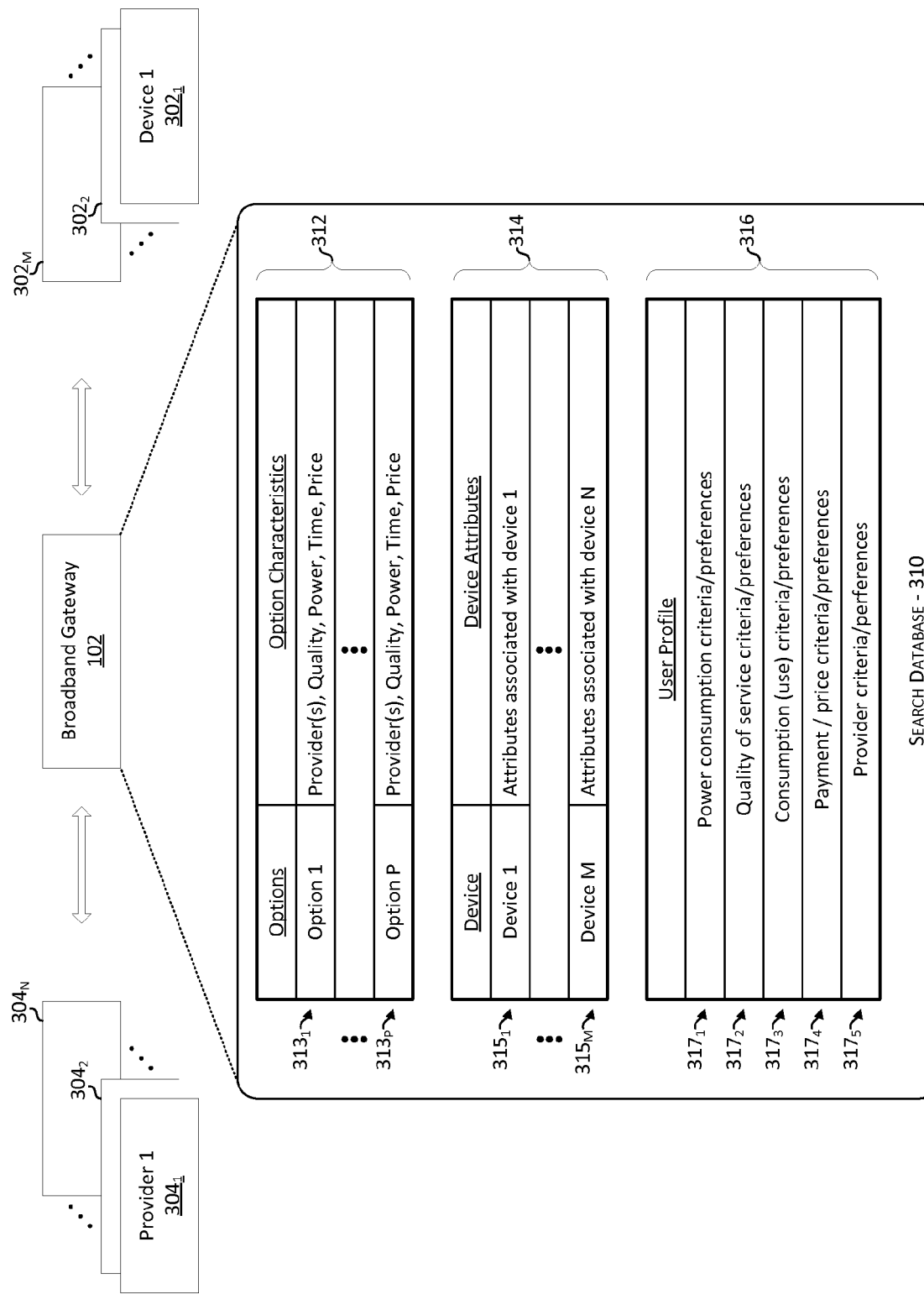
FIG. 3 is block diagram illustrating a broadband gateway operable to customize search for and/or obtaining of content, in accordance with an embodiment of the invention.

FIG. 3 is block diagram illustrating a broadband gateway operable to customize search for and/or obtaining of content, in accordance with an embodiment of the invention. Referring to FIG. 3 there is shown the broadband gateway 102, a plurality of devices $302_1$-$302_M$, a plurality of providers $304_1$-$304_N$, where N may be a positive integer and M may be a positive integer.

The plurality of devices $302_1$-$302_M$ may comprise devices that may be serviced and/or managed by the broadband gateway 102 in a home network, such as the home network 100a for example. In this regard, the plurality of devices $302_1$-$302_M$ may correspond to, and/or may be similar to the plurality of home devices 104a-104j, substantially as described with respect to FIG. 1. Each of the providers $304_1$-$304_N$ may be similar to a service provider 120 and/or a content provider 130, and/or a combined content/service provider such as provider 140, which are substantially as described with regard to FIG. 1.

In operation, the broadband gateway 102 may be utilized to provide services to a home network, such as the home network 100a. In this regard, the broadband gateway 102 may utilize negotiation related functions, including broking and/or arbitrating, with external entities, such as one or more of the providers $304_1$-$304_N$ for example, to enable provisioning requested services, such as obtaining of content, substantially as described with regard to FIGS. 1 and 2. In this regard, the broadband gateway 102 may maintain a database 310 which may be utilized in conjunction with service negotiation based operations. The database 310 may comprise an options component 312, a devices component 314, and/or one or more user profiles 316. In this regard, the options component 312 may be utilized to store information pertaining to available options for providing and/or supporting requested services. The device component 314 may be utilized to store information pertaining to devices managed and/or serviced by the broadband gateway 102, including, for example, home devices that may be utilized in conjunction with and/or for supporting requested services. The user profiles 316 may be utilized to store information pertaining to particular users (or subscribers) serviced by the broadband gateway 102.

For example, in instances where a service requested from and/or via the broadband gateway comprises delivery of particular content, the broadband gateway 102 may search for options for acquiring the particular content. The broadband gateway 102 may query, for example, a search engine and/or send individual queries to each of one or more providers $304_1$-$304_N$. The discovered options for acquiring the particular content may be stored in a options component 312 with each of the elements $313_1$-$313_P$, where P is any positive integer, corresponding to a different option. Each element $313_p$, where p is an integer between 1 and P, may store characteristics of the corresponding option. In an embodiment of the invention, each element $313_p$ may comprise a field that indicates the provider associated with the option, a field that indicates quality of service associated with the option, a field that indicates power consumption associated with the option, a field that indicates when the option is available, and a field that indicates the price of the option.

The broadband gateway 102 may also discover the devices $302_1$-$302_M$, to which it is communicatively coupled, and corresponding attributes of those devices. In this regard, one or more devices $302_1$-$302_M$ may be utilized in conjunction with use and/or consumption of the particular content once it is obtained. The attributes may be stored in a devices component 314 with each element $315_m$, where m is an integer between 1 and M, comprising the attributes of the corresponding device $304_m$. Attributes of the devices may comprise device capabilities, requirements, and/or limitations, and/or energy or cost saving options that may be utilized in conjunction with requested services. With regard to obtaining content, relevant attributes may comprise, for example, display resolution, supported video modes and/or compression protocols, number of audio channels supported, supported encoding and decoding protocols or formats, bandwidth of a connection between the device and the broadband gateway 102, whether the device is operating on battery power, and/or availability of low power mode and/or power saving states.

The broadband gateway 102 may also maintain, in the database 310, one or more instances of the user profile 316, corresponding to each user associated with the broadband gateway 102. In this regard, the user profile 316 may be utilized to store various user related information, including, for example, criteria for ranking and selecting content options. In an embodiment of the invention, the user profile 316 may comprise an element $317_1$ which comprises power consumption criteria. Power consumption criteria may indicate, for example, whether saving power is important in deciding between options for receiving particular content.

In an embodiment of the invention, the user profile 316 may comprise an element $317_2$ which comprises quality of service (QoS) criteria. Quality of service criteria may indicate, for example, latency that is acceptable and/or error rates that are acceptable. In an embodiment of the invention, the user profile 316 may comprise an element $317_3$ which comprises criteria as to when content is available. Availability criteria may indicate, for example, whether the content is desired as soon as possible or whether the user is willing to wait in order to get a lower price. In an embodiment of the invention, the user profile 316 may comprise an element $317_4$ which comprises criteria for the price of content. Pricing criteria may indicate, for example, how much the user is willing to pay for particular content or types of content. In an embodiment of the invention, the user profile 316 may comprise an element $317_5$, which may be utilized to store and/or configure criteria and/or user preferences corresponding to providers that may be utilized in conjunction with performing services requested by the user, such as for obtaining and/or delivering content. The element $317_5$ may indicate and/or list, for example, user's preferred provider(s) among the providers $304_1$-$304_N$.

FIG. 4A is a flow chart that illustrates exemplary steps for utilizing a broadband gateway to generate and/or update profiles for use in conjunction with service consumption brokering and/or arbitration, in accordance with an embodiment of the invention. Referring to FIG. 4A, there is shown a flow chart 400 comprising a plurality of exemplary steps that may be performed by a broadband gateway to enable generating and/or updating profiles for use in conjunction with service consumption brokering and/or arbitration.

In step 402, a broadband gateway may create service and/or device energy-related profiles. For example, the broadband gateway 102 may create, in the database 310, an instance of the user profile 316 for each user serviced in the home network 100a, and/or an element 315 within the devices component 314 of the database 310 for each device in a network serviced and/or managed by the broadband gateway 102. Similarly, the broadband gateway 102 may create an element 313 within the options component 312 of the database 310 for each service and/or content provider option. In step 404, the broadband gateway 102 may populate user, devices, and/or options profiles with corresponding related data. In this regard, the user, devices, and/or options profiles may be populated based on preconfigured, predetermined, dynamically determined and/or default parameters. The options profiles may be utilized to store service and/or content related parameters and/or information, which may correspond to various available contents, bitrates, PHY layers, and/or service agreements, for example. The device profiles may be utilized to store device specific information, such as capabilities, operational requirements limitations, service related configuration data or parameters, and/or energy or cost saving options. In step 406, the broadband gateway 102 may update user, devices, and/or options profiles, based on dynamic and/or autonomous monitoring and/or tracking by the broadband gateway 102, and/or based on information provided to the broadband gateway 102.

FIG. 4B is a flow chart that illustrates exemplary steps for utilizing a broadband gateway to provision requested services, in accordance with an embodiment of the invention. Referring to FIG. 4B, there is shown a flow chart 430 comprising a plurality of exemplary steps that may be performed by a broadband gateway to provision services requested in a home network, such as the home network 100a.

In step 432, a broadband gateway may receive a request to provide a service to a home network serviced by the broadband gateway. For example, the broadband gateway 102 may receive a request from a user and/or a home device in the home network 100a, to provide a service. In this regard, the requested service may comprise, for example, obtaining content for consumption via one or more home devices. In step 434, the broadband gateway may analyze information pertaining to performance of the requested service. In this regard, the broadband gateway 102 may retrieve and/or analyze the database 310, and/or elements thereof, to enable determining a plurality of options for performing the requested service. For example, the broadband gateway may analyze the various elements $313_1$-$313_P$ in the options component 312, the various elements $315_1$-$315_M$ in the devices component 314, and/or the corresponding user profile 316. In this regard, the broadband gateway 102 may determine various combinations for providing the requested service based on various factors, such as cost, energy use, user preferences, devices capabilities, and/or content configuration and/or characteristics in instances where the requested service comprises obtaining content.

In step 436, the broadband gateway 102 may negotiate with various determined options to facilitate performing the requested service. In this regard, the negotiation may utilize brokering and/or arbitration to adjust various aspects and/or features in the requested services. For example, the broadband gateway 102 may negotiate with the service provider $304_N$ to determine whether a requested service may be performed in various ways, with corresponding combinations of payment, credits, and/or energy consumption saving data. In step 438, the broadband gateway may configure performance and/or delivery of the service based on completion of negotiations performed in step 436. This may comprise, for example, configuring aspects relating to connectivity and/or interactions between the broadband gateway 102 and service/content providers.

Figure 4C:
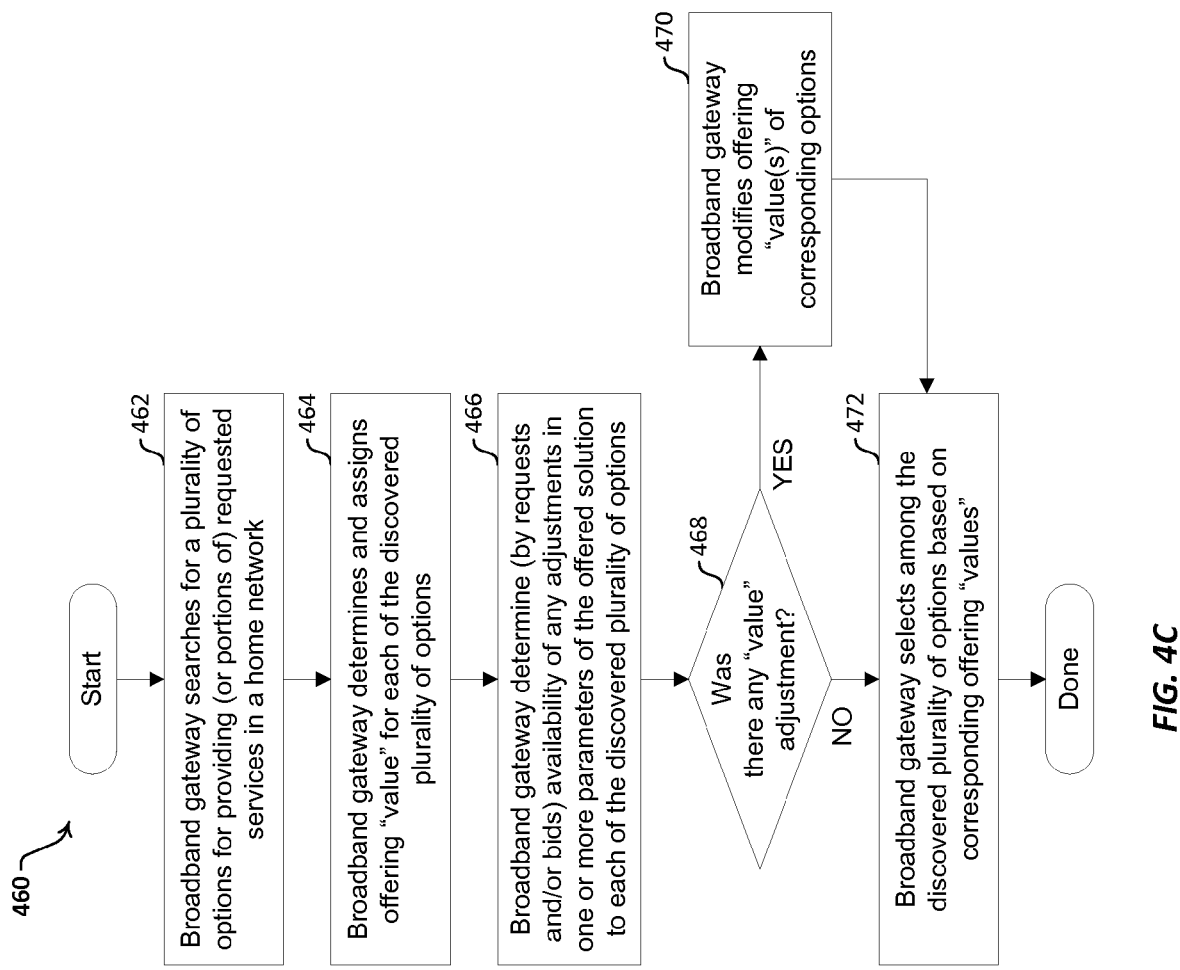
FIG. 4C is a flow chart that illustrates exemplary steps for utilizing a broadband gateway to provide brokering and/or arbitrating service consumption options, in accordance with an embodiment of the invention.

FIG. 4C is a flow chart that illustrates exemplary steps for utilizing a broadband gateway to provide brokering and/or arbitrating of service consumption options, in accordance with an embodiment of the invention. Referring to FIG. 4C, there is shown a flow chart 460 comprising a plurality of exemplary steps that may be performed by a broadband gateway to provide brokering and/or arbitrating service consumption options in a home network, such as the home network 100a.

In step 462, the broadband gateway may search for, and/or discover a plurality of options for providing (portions of) requested service. In step 464, the broadband gateway determines and assigns offering value for each of the discovered plurality of options. In step 466, the broadband gateway may determine, by for example, direct request or by soliciting bids, availability of any adjustments in one or more parameters of the offered solution to each of the discovered plurality of options. In step 468, a determination of whether there have been any value adjustments, and/or of options affected by any such adjustment is performed. In instances where there has been no value adjustment, the plurality of exemplary steps may proceed directly to step 472. In instances where there has been some value adjustment, the plurality of exemplary steps may proceed directly to step 470. In step 470, the broadband gateway may modify offering value(s) of corresponding option(s) based on determined value adjustments.

Various embodiments of the invention may comprise a method and system for utilizing a gateway for brokering and/or arbitrating service consumption options. The broadband gateway 102 may be utilized to configure and/or provision services requested by a user associated with the broadband gateway 102 in a home network, such as in the home network 100a. The service provisioning and/or configuration may be performed based on a plurality of configuration related criteria, which may be determined and/or evaluated by the broadband gateway 102. The requested services may comprise obtaining and/or delivering content for consumption by one or more of the plurality of devices $302_1$-$302_M$ in the home network 100a. Configuring and/or provisioning of requested services may comprise negotiating with at least one external resource and/or entity, such as one or more of the plurality of providers $304_1$-$304_N$, which may perform and/or support at least a portion of the requested service. For example, a provider, such as provider $304_1$ may provide the content whereas the provider $304_N$ may provide delivery of the content to the home network 102a, via one or more of the physical layer connections 208a-208j. The negotiation may comprise, for example, brokering and/or arbitrating with the plurality of providers $304_1$-$304_N$ regarding performing and/or providing the at least a portion of performance of the requested service.

The plurality of configuration related criteria may comprise, for example, device related information, user related information, energy related information, cost related information, and/or provider related information. The user related information may comprise, for example, user preferences pertaining to payment, use related information, energy, and/or or device related information. The broadband gateway 102 may store, in the database 310, information associated with one or more of the plurality of configuration related criteria. At least a portion of the database 310 may configurable by said user.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing a gateway for brokering and/or arbitrating service consumption options.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method in a broadband gateway for communication with a plurality of devices, the broadband gateway operable to handle at least one physical layer connection to at least one network access service provider, the method comprising:
   receiving a request for a service via the broadband gateway, wherein the service comprises providing content;
   determining a criteria related to the service;
   negotiating, with at least one remote resource, at least one of a manner or timing for the service by determining options, wherein the options comprise a first option using a first content provider for the content and a second option using a second content provider for the content; and
   selecting an option of the options based upon the criteria.

2. The method of claim 1 wherein the options are stored in a database, wherein the database comprises option characteristics for each option, the option characteristics comprising a provider identification, wherein the database comprises the criteria, the criteria comprising device attributes for each of the devices, wherein the device attributes comprise device capabilities related to display resolution, video modes, compression protocols, connection bandwidth, or audio channels supported, wherein the criteria further comprises a profile, the profile comprising quality of service preferences, payment preferences, or price preferences.

3. The method according to claim 1, wherein the options are stored in a database.

4. The method according to claim 3, wherein the database comprises option characteristics for each option, the option characteristics comprising a quality, time and price characteristic.

5. The method according to claim 3, wherein the database comprises the criteria and the criteria comprises a profile comprising quality preferences.

6. The method according to claim 3, wherein the database comprises device attributes for each of the devices, wherein the device attributes comprise device capabilities.

7. The method according to claim 3, wherein the database comprises a profile, the profile comprising quality of service preferences, and provider preferences.

8. The method according to claim 1, wherein the option is selected in response to a match of a preferred provider to a provider associated with the option.

9. The method according to claim 1, wherein negotiating further comprises:
   requesting an adjustment to each of the options after receiving the request for the service; and
   modifying the options before selecting the option.

10. A method in a broadband gateway for communication with a plurality of devices, the broadband gateway operable to handle at least one physical layer connection to at least one network access service provider, the method comprising:
    receiving a request for a service via the broadband gateway, wherein the service comprises providing content;
    determining a criteria related to the service; and
    negotiating, with at least one remote resource, at least one of a manner or timing for the service by determining options and selecting an option of the options based upon the criteria, wherein the options are stored in a database, wherein the database comprises option characteristics for each option, the option characteristics comprising a provider identification, and a quality, time and price characteristic, wherein the database comprises the criteria, the criteria comprising device attributes for each of the devices, wherein the device attributes comprise device capabilities related to display resolution, video modes, compression protocols, connection bandwidth, or audio channels supported, wherein the criteria further comprises a profile, the profile comprising quality of service preferences, provider preferences, payment preferences, or price preferences.

11. A system, comprising:
    one or more circuits, one or more processors, or any combination thereof for use in a gateway communicatively coupled to a plurality of devices, wherein the gateway is operable to handle at least one physical layer connection to at least one network access service provider, the one or more circuits, one or more processors, or any combination thereof being operable to:
    receive a request related to delivery of a service associated with at least one remote resource via the gateway;
    review options for the service, each of the options comprising an indication of a content provider associated with the service for the option; and select an option of the options for the service based at least in part on the indication of the content provider associated with the service for the option.

12. The system according to claim 11, wherein the service comprises at least one of obtaining or delivering content for consumption by one or more of the devices.

13. The system according to claim 11, wherein the one or more circuits, one or more processors, or any combination thereof is operable to at least one of broker or arbitrate among the options for delivery of the service, wherein the options are received from the at least one remote resource.

14. The system according to claim 11, wherein the one or more circuits, one or more processors, or any combination thereof is operable to determine at least one of a capability associated with at least one of the devices used in conjunction with the service, one or more service performance related parameters, preferences related information, pricing related information, or energy use related information and selects the option based at least in part on the one or more service performance related parameters, preferences related information, pricing related information, or energy use related information.

15. The system according to claim 11, wherein the options are stored in a database and the options are updated prior to the option being selected and after the request is received.

16. The system according to claim 11, wherein the option is selected based at least in part on the quality of service associated with the service for the option, and a price associated with the service for the option.

17. A method, comprising:
receiving, by a broadband gateway, a request for delivery of content, the request including a timing or manner criteria related to the request; and
negotiating, by the broadband gateway, at least one of a manner or timing in which the content is delivered to the broadband gateway based on at least in part on the timing or manner criteria, wherein negotiating comprises brokering or arbitrating among a plurality of options associated with the delivery of content, wherein the options include the delivery of content from a first content provider and the delivery of content from a second content provider.

18. The method according to claim 17, further comprising searching, by the broadband gateway, for the options among a plurality of remote resources.

19. The method according to claim 17, further comprising storing, by the broadband gateway, the criteria, the criteria comprising information for ranking the options.

20. The method according to claim 19, wherein the information comprises at least one of power consumption preferences, payment preferences, or provider preferences.

* * * * *